2,765,358

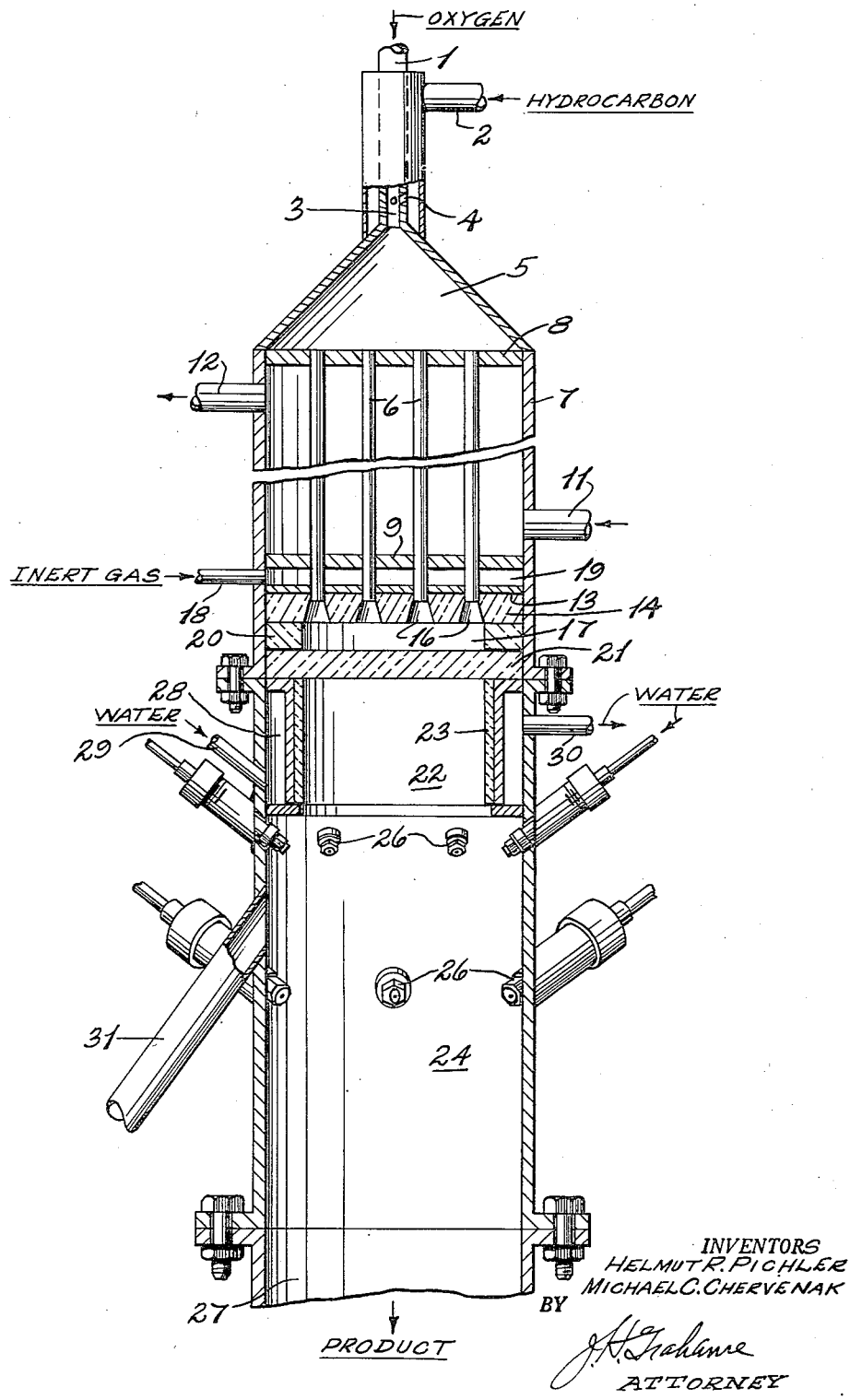

Patented Oct. 2, 1956

2,765,358

PRODUCTION OF ACETYLENE AND REACTOR THEREFOR

Helmut R. Pichler and Michael C. Chervenak, Trenton, N. J., assignors to Hydrocarbon Research, Inc., New York, N. Y., a corporation of New Jersey Application April 16, 1953, Serial No. 349,212

6 Claims. (Cl. 260—679)

This invention relates to a method and apparatus for the reaction of a gasiform hydrocarbon with an oxygen-containing gas. In one of its more specific aspects, it relates to a method of reacting a gasiform hydrocarbon with oxygen to produce acetylene.

The production of acetylene by reaction of a hydrocarbon with oxygen under controlled reaction conditions has been previously investigated. It is known that acetylene may be produced by reacting a hydrocarbon in gas phase with a limited amount of oxygen at a temperature above 2,000° F., and with a reaction time between 0.001 and 0.1 second. Generally, the reaction is conducted at a temperature within the range of from about 2,500° F. to about 3,500° F. The quantity of oxygen relative to the quantity of hydrocarbon is usually within the range of from 0.45 to about 0.65 mol of oxygen per atom of carbon in the hydrocarbon. The process is usually carried out at atmospheric pressure. Quenching the reaction products is necessary to limit the reaction time and to minimize decomposition or other undesired reaction of the acetylene. The reaction may be quenched, or the reaction products "frozen," by substantially instantaneously cooling the reaction products to a temperature well below the reaction temperature, for example, to 800° F., or lower. According to one of the processes of the prior art, relatively pure oxygen and a gasiform hydrocarbon, for example, natural gas or coke oven gas, are separately preheated, admixed with one another and the resulting mixture introduced into a reaction zone through a perforated block having a plurality of openings of small diameter. The mixture is introduced at such a rate that the velocity through the openings is in excess of the rate of flame propagation. The reaction zone contains no packing or catalyst and is so designed that the flow path of the reactants and resulting reaction products through the reactor is relatively short. The reaction products are quenched by direct contact with a water spray to limit the total reaction time to a period within the range of 0.001 to 0.1 second.

Liquid or gaseous hydrocarbons may be utilized in the process. Liquid hydrocarbons are vaporized prior to forming the hydrocarbon-oxygen mixture which is passed through the feed openings into the reaction zone.

Commercially pure oxygen, e. g., oxygen obtained by rectification of air and containing in excess of about 90 per cent oxygen by volume, is suitable for use in this process. Commercial oxygen often is available in a concentration in excess of 95 per cent oxygen by volume; such concentrations are preferred.

Preheating the reactants has a beneficial effect on acetylene yield, the yield increasing as the preheat temperature is increased. As an example of the beneficial effect of high preheat temperature on acetylene yields, comparative data obtained employing oxygen and natural gas as feed indicated an increase in the acetylene content of the product gas from an average of 7.0 volume per cent with a preheat temperature of 900° F. to about 9.0 with a preheat temperature of 1,300° F. In addition to the increased concentration of acetylene in the product gas which results from high preheat temperatures, the oxygen requirements are also reduced. With a preheat temperature of 900° F., approximately 5.6 pounds of oxygen are required per pound of acetylene produced, whereas at 1,300° F. only about 4.0 pounds of oxygen are required per pound of acetylene produced.

Preheating of the reactants to temperatures on the order of 1,000° F. and higher has not been practical in commercial operations because of the prevalence of flashbacks and preignition of the reactants within the mixing equipment. Spontaneous ignition, or preignition, is apt to take place when relatively pure oxygen is mixed with hydrocarbons at high temperatures above about 800° F., particularly in the presence of a catalytic surface, e. g., iron. Often there are localized high concentrations of oxygen at the point of mixing which are conducive to preignition. A flashback occurs when there is ignition of the combustible mixture within the mixing zone as the result of the flame travelling from the reaction zone into the mixing zone. Slight operational fluctuations may cause flashbacks to take place even though the mixed gases are supplied to the reactor through conduits or passageways of very small diameter at a velocity in excess of the rate of flame propagation. Preignition and flashbacks interrupt the operation, necessitate shutting down the reactor, and very often damage the equipment.

In our copending application, S. N. 336,152, filed February 10, 1953, there is disclosed a method for the production of acetylene by reaction of a hydrocarbon with oxygen wherein the reactants are preheated to an elevated temperature and charged to a reaction zone of the general type referred to hereinabove without danger of preignition of the reactants. As disclosed in said application, the hydrocarbon and oxygen are separately preheated to a high temperature, which may approach 1,200° F., the preheated reactants are brought together in a non-catalytic mixing zone, e. g., a zone having walls of enamelled metal or ceramic material, where they are rapidly and intimately mixed with one another, and the mixture is passed through a porous barrier into the reaction zone. In accordance with the process disclosed in said application, the mixture is passed through a porous barrier, which effectively prevents flashbacks, into the reaction zone where the ultimate reaction takes place at a temperature above 2,500° F. The porous barrier is constructed of a material which is substantially non-catalytic with respect to the reactants. Suitable barriers may be prepared by cementing or sintering refractory particles leaving interstitial passageways. Satisfactory barriers include porous alundum (aluminum oxide) plates about one inch in thickness and having a permeability of 80 to 120 standard cubic feet of air per minute per square foot of cross-sectional area with a pressure drop of two inches of water. The gas passageways through such porous plates are very small in cross section, having an equivalent diameter on the order of 100 to 1,000 microns (0.1 to 1 mm.). These passageways are non-linear, i. e., they do not extend through the plate in a straight path, but instead present tortuous paths for the gas flow. These porous barriers are preferred in carrying out the process of our present invention.

We have now found, unexpectedly that it is possible to mix a hydrocarbon in gaseous phase with oxygen at a temperature below the temperature of incipient ignition and subsequently heat the mixture to a high temperature on the order of 1,400° F. without danger of spontaneous ignition. We have found that an oxygen-hydrocarbon mixture may be safely preheated to a high temperature in a small diameter tube through which the mixture is passed at high velocity. The heating tubes may even be of metal which is ordinarily catalytic with respect to ignition.

The present invention provides a method of safely preheating an oxygen-hydrocarbon mixture and of supplying a highly preheated mixture of oxygen and hydrocarbon to a high temperature reaction zone. The present invention also provides improved apparatus for the preparation of a heated reactant mixture.

In accordance with our invention, a hydrocarbon in gaseous phase is thoroughly and uniformly mixed with oxygen at a temperature below that at which spontaneous ignition takes place and the mixture is then passed at high velocity through a heating zone consisting of small diameter tubes to heat the mixture to a temperature above 1,000° F., preferably above 1,100° F. and approaching 1,400° F. It is generally preferable to mix the reactants at a temperature below about 600° F.

The heating zone may consist, for example, of stainless steel tubes of about ¼ to ½ inch, inside diameter. The reactant mixture will have a gas velocity in excess of 100 feet per second when it attains a temperature of 1,000° F. The design of the heater must be such that none of the highly preheated gas has an opportunity for extended time of contact with the hot metal.

It is necessary to distribute the gas from the high velocity preheating zone to the porous plate or flame arrestor of the reaction zone. For this purpose, a distribution zone is provided and is made of a material such as a refractory or enamelled metal which is non-catalytic with respect to preignition of the preheated reactant mixture.

The preheated mixture is introduced into the reaction zone through a porous plate, as disclosed in our above-mentioned copending application. A gas velocity at the discharge side of the porous plate within the range of from about 10 to about 30 feet per second generally gives satisfactory operating conditions within the reactor.

The pressure within the reactor is generally maintained at about atmospheric or slightly above atmospheric pressure. The pressure upstream from the porous barrier need be sufficient only to insure the desired rate of feed of reactants into the reaction zone through the porous barrier. With a relatively porous barrier, satisfactory flow rates are obtained with a pressure drop across the barrier of from about 0.2 to about 5 pounds per square inch.

For the production of acetylene, a reaction temperature within the range of from about 2,500° F. to about 3,200° F. is preferred. An average temperature of about 2,800° F. has been found satisfactory.

The method and apparatus of this invention may be more readily understood by referring to the accompanying drawing, which is an elevational view, in cross-section, of a preferred embodiment of apparatus suitable for carrying out the invention.

With reference to the drawing, a stream of oxygen is introduced to the apparatus through line 1 and a stream of hydrocarbon in gas phase, e. g., natural gas, is introduced through line 2 into a mixing zone 3. The hydrocarbon is discharged through openings 4 into the oxygen stream. This effects rapid and intimate admixture of the hydrocarbon and oxygen. The gas mixture is introduced by way of distributing chamber 5 into one end of a plurality of tubes 6 surrounded by a shell 7. The tubes are held in place by tube sheets 8 and 9.

The mixture of oxygen and hydrocarbon passing through tubes 6 is heated by indirect heat exchange with a heating fluid, for example, hot flue gas, introduced through line 11 and discharged through line 12.

Tubes 6 extend beyond tube sheet 9 through a plate 13 into a ceramic block 14. A frusto-conical discharge port 16 is provided in the ceramic block 14 for each of the heater tubes 6. These discharge ports open into a feed chamber 17 from which the highly preheated gases flow to the reaction zone. Chamber 17 is provided with a refractory lining 20.

In the embodiment illustrated in the drawing, the ends of tubes 6 extending through plate 13 and block 14 do not form a gas-tight seal with plate 13 or block 14. Inert gas, for example, nitrogen or flue gas, is introduced through line 18 in a sealing chamber 19 between tube sheet 9 and plate 13. The inert gas filling chamber 19 is maintained at a pressure in excess of the pressure within chamber 17. Any leakage between the heating tubes 6 and plate 13 or block 14 is from chamber 19 to chamber 17. This prevents accumulation of an oxygen-hydrocarbon mixture in static contact with heated tubes 6.

The gas velocity through the heating tubes is maintained in excess of 100 feet per second, preferably at least about 300 feet per second, where the gas mixture has attained a temperature of 1,000° F. and higher. It will be evident that for any given reactor, the size and number of heating tubes may be selected to produce any desired gas velocity within the tubes. Preferably the tubes are not larger than ½ inch, inside diameter. We have found that by maintaining a high velocity of the gas over the heated surface, we can eliminate preignition of the gas even in steel tubes.

The preheated gas mixture from feed chamber 17 passes through a porous plate 21 into a reaction chamber 22 lined with refractory 23. In this particular embodiment, the reaction chamber is cylindrical, with the porous plate 21 forming an end wall of the cylinder. The opposite end of the reaction chamber is open.

The reaction products are discharged from the opposite or open end of the reaction chamber into a cooling chamber 24 wherein the gases are intimately contacted with water introduced as a spray through a plurality of nozzles 26, arranged about the wall of the cooling chamber. The cooled product gas, water vapor, and unvaporized water are discharged into an outlet conduit 27.

The inner surface of refractory wall 23 of the reaction zone is maintained at a temperature several hundred degrees below the reaction temperature by means of a cooling jacket 28 surrounding wall 23 of the reaction zone. A cooling fluid, e. g., water, is circulated through the cooling jacket. Coolant is introduced to and discharged from the cooling jacket by means of conduits 29 and 30, respectively. As disclosed in our above-mentioned copending application, cooling of the wall of the reactor prevents deposition of carbon on the wall. Refractory cement may be provided between the cooling jacket 28 and the wall 23 of the reaction zone.

Ignition of the reactants is acomplished by inserting an ignitor element, for example, ignition electrodes, through ignition tube 31.

The process of the invention is illustrated in the following example. A stream of natural gas having a carbon number of 1.08 is mixed at atmospheric temperature with a stream of substantially pure oxygen (98 per cent oxygen by volume) in the proportions of 2,000 and 1,206 standard cubic feet per hour, respectively, and the mixture is passed through a preheater containing 18 externally heated stainless steel tubes (Schedule 40, type 304) having an inside diameter of 0.269 inch and a length of 10 feet. The tubes terminate in an alundum plate 1 inch thick provided with frusto-conical ports ⅞ inch in diameter at the large end and ¾ inch in depth. The heated gas, at a temperature of 1,300° F., discharges into a feed chamber 1 inch deep and 5 inches in diameter. From the feed chamber the gases pass through a porous alundum plate 1 inch thick into one end of a cylindrical reaction chamber 5 inches in diameter and 4½ inches in length. The porous plate has a permeability of about 120. The reaction zone operates at substantially atmospheric pressure. The pressure drop across the porous plate is approximately 2 pounds per square inch. The velocity within the heating tubes is approximately 325 feet per second where the gas attains a temperature of 1,000° F. and approximately 400 feet per second at 1,300° F. The average temperature within the reaction zone is about 2,800° F.

The inner wall of the reaction chamber is composed of fused alumina ⅜ inch in thickness. Surrounding the inner wall is a metal-walled water jacket through which cooling water is continuously circulated.

The reaction products are quenched to a temperature of about 180° F. almost instantaneously by contact with water spray introduced into the product gas through a plurality of spaced nozzles.

The composition of the product gas, expressed in volume per cent (after removal of water), is as follows:

| | |
|---|---|
| Hydrogen | 54.4 |
| Carbon monoxide | 25.0 |
| Acetylene | 9.1 |
| Higher acetylenes | 0.4 |
| Methane | 6.0 |
| Higher hydrocarbons | 0.6 |
| Carbon dioxide | 3.5 |
| Oxygen and nitrogen | 1.0 |

No carbon is deposited in the heating tubes and there is no increase in the pressure drop across the porous plate in extended runs lasting several weeks.

Although the invention has been described as applied to the production of acetylene and is particularly adapted to this operation, it is also applicable to other reactions, particularly those in which it is desirable to supply a preheated mixture of oxygen and hydrocarbon to a reaction zone. The process of this invention may, for example, be applied to the generation of hydrogen and carbon monoxide by reaction of a hydrocarbon with an oxygen-containing gas.

Obviously, many modifications and variations of the invention as hereinbefore set forth may be made without departing from the spirit and scope thereof, and therefore only such limitations should be imposed as are indicated in the appended claims.

We claim:

1. In a process for the production of acetylene by reaction of a gasiform hydrocarbon with oxygen in a reaction zone at a temperature above about 2500° F., the improvement for producing said acetylene in a concentration in excess of 7% by volume in the resulting reaction gases which comprises: forming at a temperature below about 600° F. a uniform mixture consisting essentially of said hydrocarbon and oxygen of more than 90% by volume purity in the proportions of about 0.45 to 0.65 mol of oxygen per mol of carbon atoms in said hydrocarbon, passing said mixture at high velocity through an externally heated tube of small diameter, said velocity being in excess of 100 feet per second where said mixture attains a temperature of 1000° F., and discharging said mixture thus preheated to a temperature of at least 1100° F. but without preignition from said heated tube and thence at decreased velocity through a permeable refractory barrier having tortuous gas passageways into said reaction zone wherein the thus discharged mixture is self-sufficient in maintaining the desired reaction at said temperature above about 2500° F.

2. A process as defined in claim 1 wherein said tube is not larger than about one-half inch, inside diameter.

3. A process as defined in claim 1 wherein said mixture is preheated to a temperature on the order of 1400° F.

4. A process as defined in claim 1 wherein said velocity in excess of about 100 feet per second is at least about 300 feet per second.

5. A process as defined in claim 1 wherein said hydrocarbon is natural gas, said mixture is preheated to a temperature on the order of 1400° F., and said velocity in excess of about 100 feet per second is at least about 300 feet per second.

6. In a hydrocarbon-oxygen reactor for acetylene production comprising a mixing chamber for gasiform hydrocarbon and oxygen, and an unpacked reaction chamber in line of flow therewith, the improvement which comprises: a plurality of externally heated tubes of small diameter adapted to conduct at high velocity and concurrently to preheat to temperature above 1000° F. a mixture of said hydrocarbon and oxygen passing therethrough from said mixture chamber towards said reaction chamber, a short hot gas distributing chamber at the discharge ends of said tubes, and a permeable refractory barrier having tortuous gas passageways, said barrier being positioned to separate said distributing chamber from said reaction chamber and extending over an area normal to the flow of said mixture which is greater than the total area of said ends of said tubes.

References Cited in the file of this patent

UNITED STATES PATENTS

| | | |
|---|---|---|
| 1,823,503 | Mittasch et al. | Sept. 15, 1931 |
| 2,191,510 | Whitehurst | Feb. 27, 1940 |
| 2,195,227 | Sachsse | Mar. 26, 1940 |
| 2,498,444 | Orr | Feb. 21, 1950 |
| 2,664,450 | Sachsse et al. | Dec. 29, 1953 |
| 2,679,540 | Berg | May 25, 1954 |
| 2,679,543 | Dorsey | May 25, 1954 |